US006182401B1

(12) United States Patent
McManus et al.

(10) Patent No.: US 6,182,401 B1
(45) Date of Patent: Feb. 6, 2001

(54) RETRACTABLE ROOM SUPPORT MECHANISM

(76) Inventors: Patrick W. McManus, 1023 W. Eighth St.; James E. Dewald, 517 N. Benton, both of Mishawaka, IN (US) 46544; Martin P. McManus, 1421 Hampshire Dr., South Bend, IN (US) 46614

(*) Notice: Under 35 U.S.C. 154(b), the term of this patent shall be extended for 0 days.

(21) Appl. No.: 09/186,171

(22) Filed: Nov. 4, 1998

Related U.S. Application Data (63) Continuation-in-part of application No. 08/957,721, filed on Oct. 24, 1997.
(60) Provisional application No. 60/075,833, filed on Feb. 24, 1998.

(51) Int. Cl.[7] ........................................... B60P 3/34
(52) U.S. Cl. .................... 52/67; 52/64; 52/79.5; 296/26.09; 296/26.13
(58) Field of Search .................. 52/67, 64, 79.5, 52/79.8; 296/26.03, 26.08, 26.09, 26.13, 26.12

(56) References Cited

U.S. PATENT DOCUMENTS

| | | |
|---|---|---|
| 3,046,047 | 7/1962 | Ferrera . |
| 3,106,750 | 10/1963 | Jarman . |
| 4,312,159 * | 1/1982 | Paul ........................................... 52/67 |
| 4,930,837 | 6/1990 | Marsh et al. . |
| 5,090,749 | 2/1992 | Lee . |
| 5,398,986 | 3/1995 | Koob . |
| 5,491,933 | 2/1996 | Miller et al. . |
| 5,577,351 | 11/1996 | Dewald et al. . |
| 5,586,802 | 12/1996 | Dewald et al. . |
| 5,620,224 * | 4/1997 | DiBiagio et al. ................. 296/26.13 |
| 5,706,612 | 1/1998 | Tillet . |
| 5,787,650 * | 8/1998 | Miller et al. .............................. 52/67 |
| 5,788,306 | 8/1998 | DiBiagio et al. . |
| 5,791,715 * | 8/1998 | Nebel .................................. 52/67 X |
| 5,833,296 * | 11/1998 | Schneider .......................... 296/26.13 |
| 5,857,733 | 1/1999 | Dewald et al. . |
| 5,984,396 * | 11/1999 | Schneider ...................... 296/26.13 X |

FOREIGN PATENT DOCUMENTS 1470553    1/1967  (FR) .

* cited by examiner

Primary Examiner—Beth A. Stephan
Assistant Examiner—Brian E. Glessner
(74) Attorney, Agent, or Firm—Baker & Daniels (57) ABSTRACT

Transportable living quarters includes a main frame supporting a main living area and a slide out room which slides between an extended and retracted position relative to the main living area. An extendable member is mounted on the main frame and is rigidly connected to the slide out room floor, so that the weight of the slide out room is transferred from the floor of the main living to the extendable member as the slide out room slides between the retracted and extended positions. In one embodiment of the invention, the floor of the slide out room is leveled with respect to the floor of the main living area when the slide out room is moved to the extended position by bending of the extendable support member in response to the weight transfer. According to the second embodiment of the invention, the weight transfer of the slide out room from the floor of the main living area to the extendable member causes the inner tubular member to deflect relative to the outer tubular member through the clearance provided between the members.

34 Claims, 10 Drawing Sheets

RETRACTABLE ROOM SUPPORT MECHANISM

This application is a continuation-in-part of U.S. patent application Ser. No. 08/957,721, filed Oct. 24, 1997, and also claims priority based upon U.S. Provisional Patent Application Ser. No. 60/075,833, filed Feb. 24, 1998.

This invention relates to recreational vehicle or manufactured housing unit having a retractable room in which the floor of the retractable room moves to a position flush with the floor of the main living area when the retractable room is extended.

The widths of recreational vehicles and manufactured housing units are limited to that which may be accommodated for travel on public roads. Accordingly, it is increasingly common to provide recreational vehicles and manufactured housing units with a slide out room that can be retracted into the main living quarters when the unit is being moved or driven but which can be extended from the main living quarters to provide auxiliary living space when the unit is parked for use or when the manufactured home is assembled at the home site. When the room is retracted into the main living quarters, the floor of the retractable room slides over the floor of the main living quarters and hence the level of the retractable room floor must be offset from the main floor when the retractable room is retracted. When the retractable room is extended to provide additional living space, most users find the difference in floor levels between the main living quarters and the extended room to be unsatisfactory, and thus it is desirable to provide a mechanism for bringing the floor of the slide out room flush with the floor in the main living quarters when the slide out room is extended. Such mechanisms known in the prior art require relatively complicated mechanisms and are relatively costly.

According to one embodiment of the present invention, bending of the extendible members which support the slide out room is designed to correspond to movement of the room such that in it's fully extended position the extendible member connected to the slide out room deflects just enough to permit the floor of the slide out room to be flush with the floor of the main living quarters. Accordingly, the extendible member may be rigidly connected to the slide out room, eliminating the complicated prior art movable linkages. An adjustment mechanism adjusts the angle of the extendible members so that the floor of the slide out room is level with the floor of the main living quarters when the slide out room is fully extended. According to another embodiment of the invention, the extendible members are mounted on a pivot mechanism which is adjustable to adjust the angle of extension of the members so that the floor of the slide out room is flush with the floor of the main living quarters. Accordingly, the slide out room drops into a position which is Hush with the floor of the main living quarters as the slide out room is moved into the extended position. The actuation mechanism requires only a few additional components than prior art mechanisms which maintain a difference in levels between the floors of the main living quarters and the floor of the slide out room.

These and other advantages of the present invention will become apparent from the following description, with reference to the accompanying drawings, in which.

Figure 1:
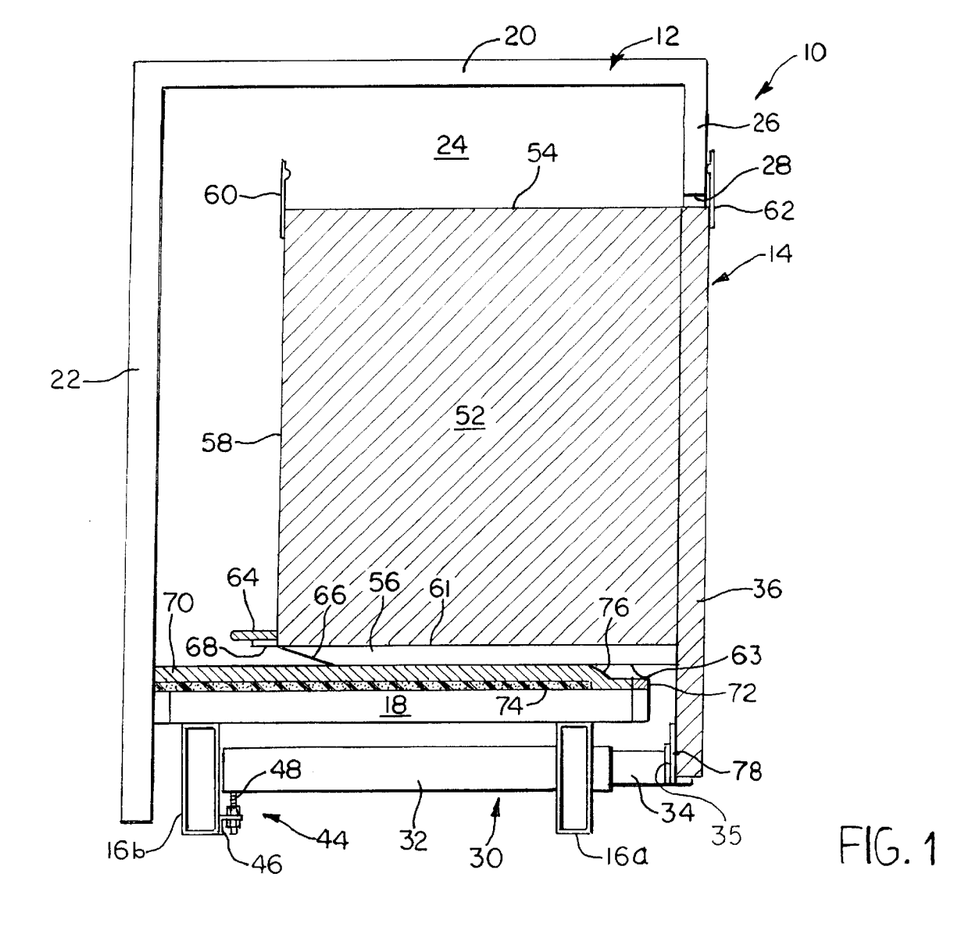
FIG. 1 is a transverse cross sectional view of a mobile living quarters incorporating a slide out room made pursuant to the teachings of the present invention; the slide out room being shown in the retracted position retracted into the main living quarters.

Referring now to the drawings, mobile living quarters generally indicated by the numeral 10 includes a main living area generally indicated by the numeral 12 and an auxiliary living area or slide out room generally indicated by the numeral 14. A pair of conventional, longitudinally extending frame members 16a, 16b support the floor 18 of the main living quarters 12. Main living quarters 12 further include a ceiling 20, a side wall 22, a pair of end walls (only one of which being shown at 24), and a side wall 26 opposite the side wall 22, a portion of which is cut away to define an opening 28 through which the slide out room 14 extends and retracts. The frame members 16a, 16b conventionally are supported by a wheel and axle assembly (not shown) to permit the mobile living quarters 10 to be moved. One or more extendible tubular members generally indicated by the numeral 30 are mounted between frame members 16a, 16b. The extendible member 30 includes an outer tubular member 32 which slidably receives an inner tubular member 34, which includes an end 35 which is rigidly secured to the lower portion of outer wall 36 of the slide out room 14.

Figure 5:
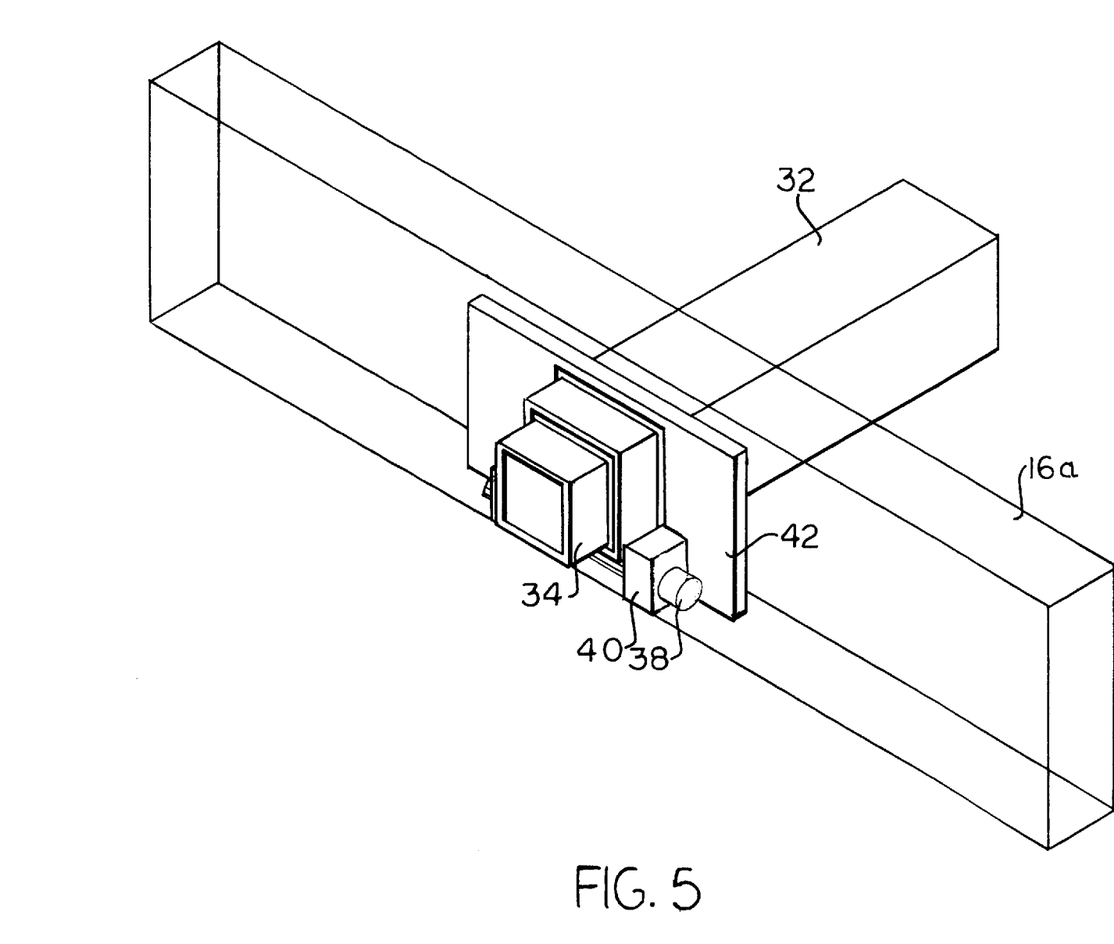
FIG. 5 is view in perspective of the pivot connection between the extendible members supporting the slide out room and the elongated frame members of the main living quarters.
Figure 6:
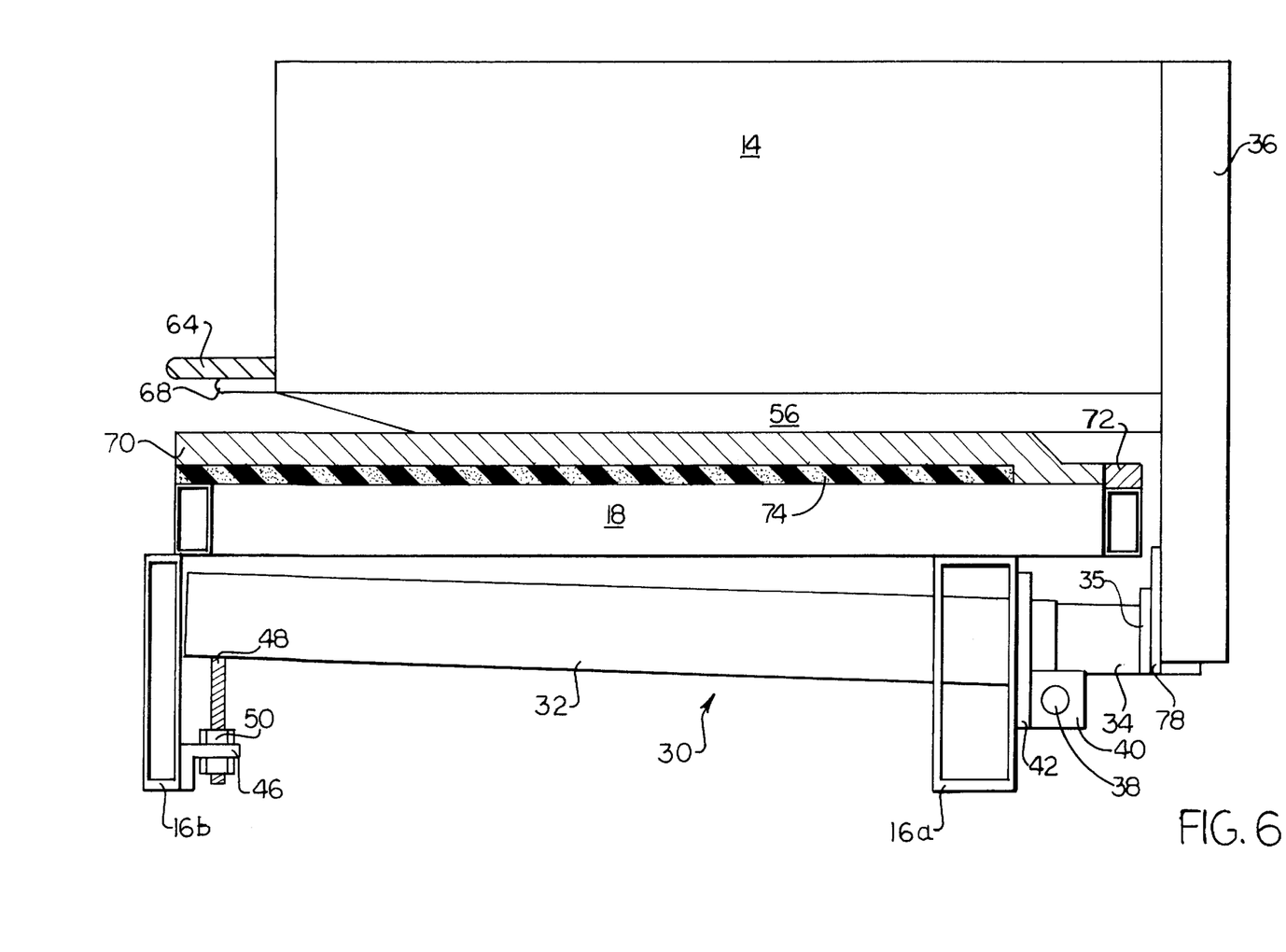
FIG. 6 is an enlarged, detailed view of another embodiment of the present invention illustrating the slide out room and a portion of the floor and the supporting structure of the main living quarters in cross section.

Referring now to FIG. 5, the extendible member 30 extends through the frame member 16a and is secured thereto via a pivot pin 38 which is welded or similarly affixed to the outer member 32 and which is pivotally received in a pair of ears 40 which are rigidly secured to a reinforcing plate 42 which is welded or otherwise affixed to the frame member 16a. The opening in the reenforcing plate 42 and in the frame member 16a is sufficiently larger than the outer member 32 to permit limited pivotal movement of the latter with respect to the longitudinal frame member 16a. Pivoting of the extendible member 30 relative to the frame member 16a as discussed above is controlled by a height adjusting mechanism generally indicated by the numeral 44. Mechanism 44 includes a bracket 46 secured to the frame member 16b and a threaded member 48 which can be adjusted upwardly and downwardly by its threaded connection with nut 50 secured to the bracket 46. The end of the threaded member 48 engages the outer member 32, to pivotally adjust the latter relative to the frame member 16a. The inner member 34 is received within the outer member 32 with a small clearance, but which nonetheless allows limited pivotal movement of the inner member 34 with respect to the outer member 32 as will hereinafter be described.

In addition to the front wall 36, the slide out room 14 includes a pair of end walls (only one of them being shown as at 52), a ceiling 54, and a floor 56, the ends walls 52, the ceiling 54, and the floor 56 define an opening 58 which is open to the main living quarters and provides access to the auxiliary living space provided by the slide out room 14. Sealing members 60, 62 extend outwardly from the ceiling 54 and end walls 52 to engage the portions of the wall 26 circumscribing the aperture 28 to thereby provide seating of the slide out room 14 with respect to the main living quarters 12 when the slide out room is in the fully retracted and in the fully extend position. Floor 56 of the slide out room 14 includes an upper surface 61 and a lower surface 63. Carpeting 64 is secured to the upper surface 61. A ramp 66 slopes downwardly from a point adjacent the end of the end wall 52 defining the opening 58 at a predetermined angle and intersects the lower surface 63. An outwardly extending tab portion 68 of floor 61 extends outwardly from the opening 58 and a portion of the carpet 64 extends beyond the tab 68. When the slide out room 14 is fully retracted as in FIG. 1, the lower surface 63 rests on carpeting 70 which covers the floor 18 of the main living quarters 12. A wear bar 72 extends longitudinally along the edge of the floor 18 defining the opening 28. Padding 74 is disposed between the carpeting 70 and the floor 18, but the padding 74 is cut short of the wear bar 72 so that,the carpeting slopes downwardly as at 76 adjacent the wear bar 72.

As is well known to those skilled in the art, a cantilevered beam, which is represented by the inner member 34 as the slide out room is moved to the fully extended position, deflects or bends as a function of the weight applied to the beam, the distance from the weight to the point at which the bean is supported, the thickness of the beam and the type of material from which the beam is made. In FIG. 1, with the room in the fully retracted position, almost all of the weight of the room is borne through the floor 18 and a relatively small part of the weight of the room is borne through the inner member 34. According, the inner member 34 does not bend by any noticeable amount.

Figure 2:
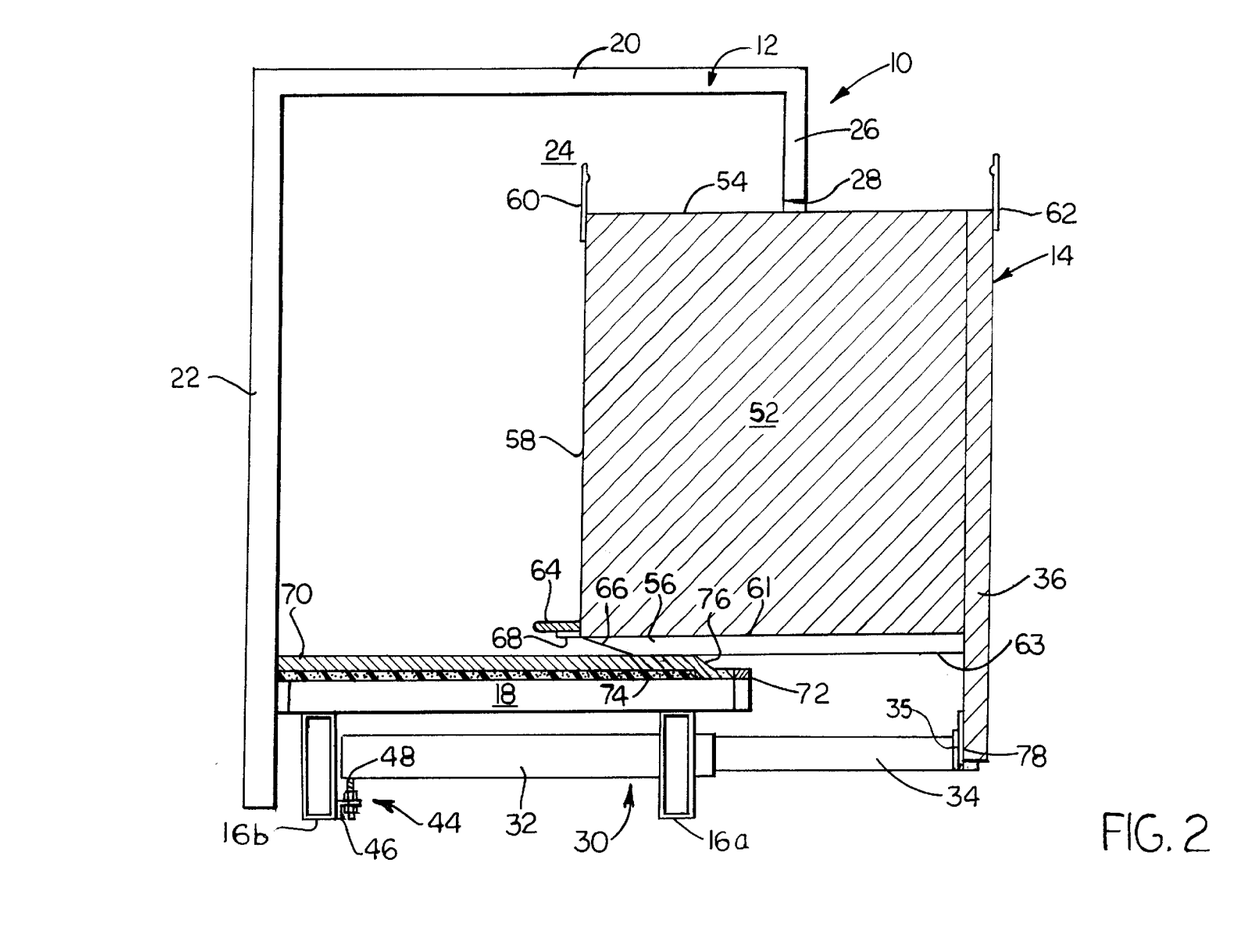
FIG. 2 is a view similar to FIG. 1, but illustrating the slide out room in an intermediate position between the fully retracted and the fully extended position.
Figure 3:
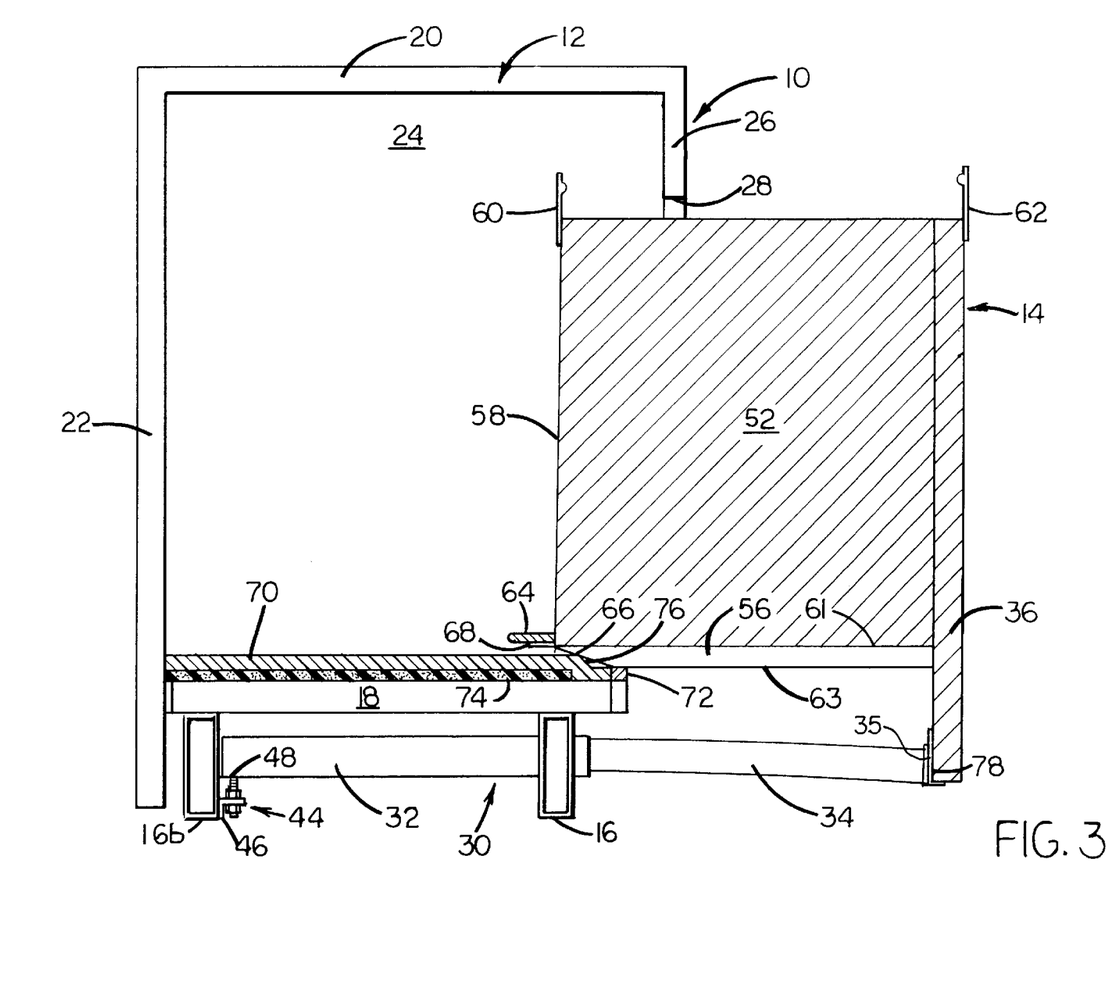
FIG. 3 is a view similar to FIG. 2, but illustrating the slide out room approaching the fully extended position.

Referring to FIG. 2, the slide out room 14 has been extended an appreciable amount, but the floor 56 still rests upon the floor 18. Although a substantial percentage of the weight has been transferred to the inner member 34, a substantial portion is still borne through the floor 18. Accordingly, the inner member 34 deflects only slightly, since the weight applied to inner member 34 and the length of the member 34 from its support is such that the deflection is minimized. However, in FIG. 3, the end of the ramp 66 has reached the wear bar 72. Accordingly, a relatively high percentage of the weight of the room is now borne through the inner member 34, and the inner member 34 has been further extended from its support, so that the bending or deflection is now substantial. It will be noted that the bending has increased substantially between the FIG. 2 and the FIG. 3 positions just as the ramp 66 has moved down the sloped surface 76. The added bending of the inner member 34 during movement of the room between the FIG. 2 and the FIG. 3 position substantially matches the difference in height of the floor the room as the ramp 66 passes along the sloped surface 76. Accordingly, the floor remains level despite the vertical movement of the room. This occurs because the wall thickness and material of the inner member 34 has been chosen to permit a deflection that is substantially equal to this vertical movement of the slide out room.

Figure 4:
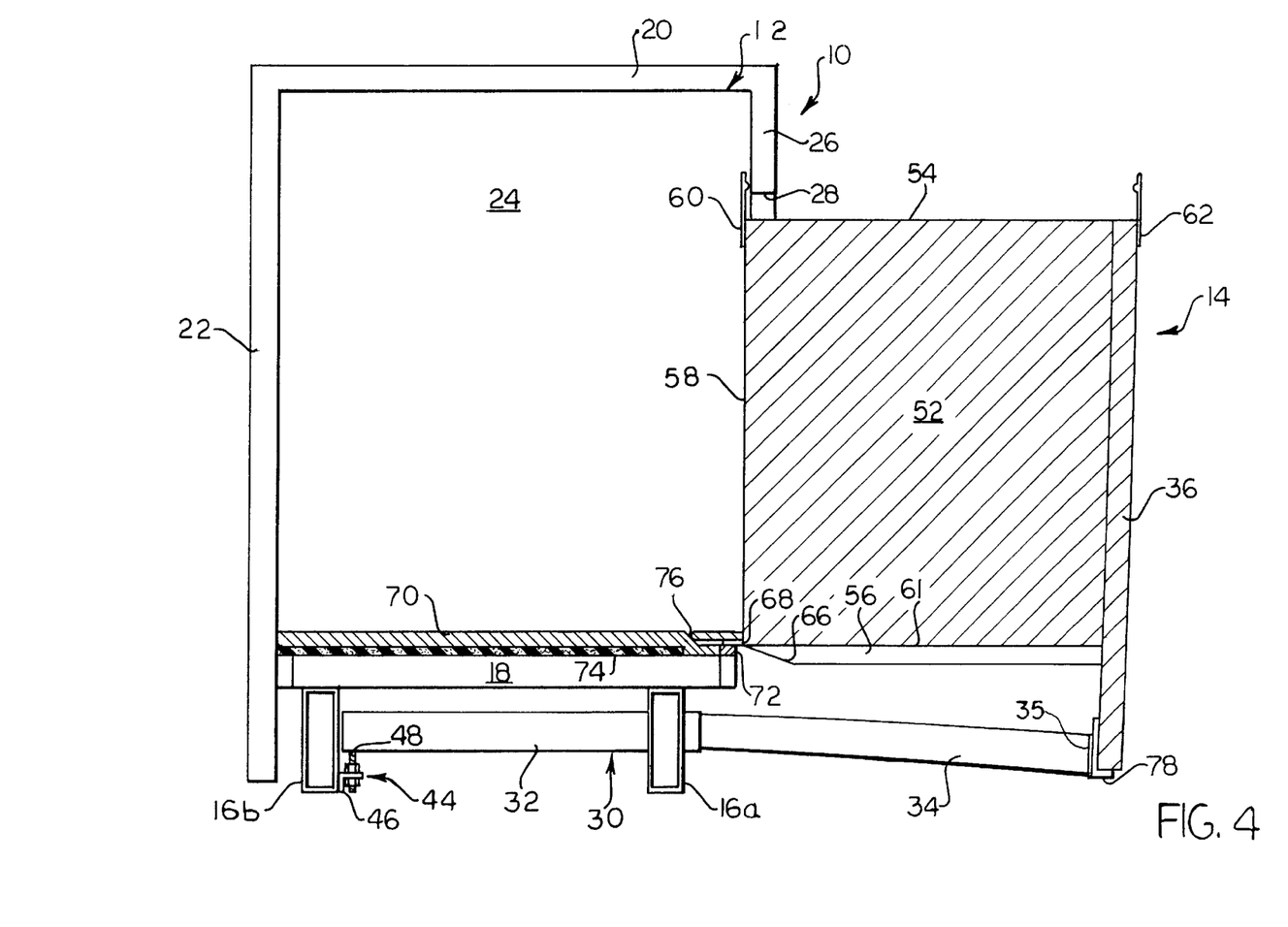
FIG. 4 is a view similar to FIGS. 1–3, but illustrating the slide out room in the fully extended position.

Referring to FIG. 4, the ramp 66 has now moved over the wear bar 72 and the room is now in its fully extended position in which the level of the floor room is now substantially equal to that of the floor 18. The inner member 34 bends further as the slide out room moves so that the floor 56 of the slide out room 14 remains level. Height adjustor 44 can be operated to adjust the end of the member 34 which is attached to the wall 36 by connecting mechanism 78 so that the floor 56 will be level when the slide out room is fully extended. Since a small adjustment of the height adjustor 44 is all that will be necessary to level the floor 60, the welds connecting the outer member 32 with the frame member 16a may be sufficiently flexible to allow this adjustment to be made without the pivot connection provided by the pin 38.

Figure 7:
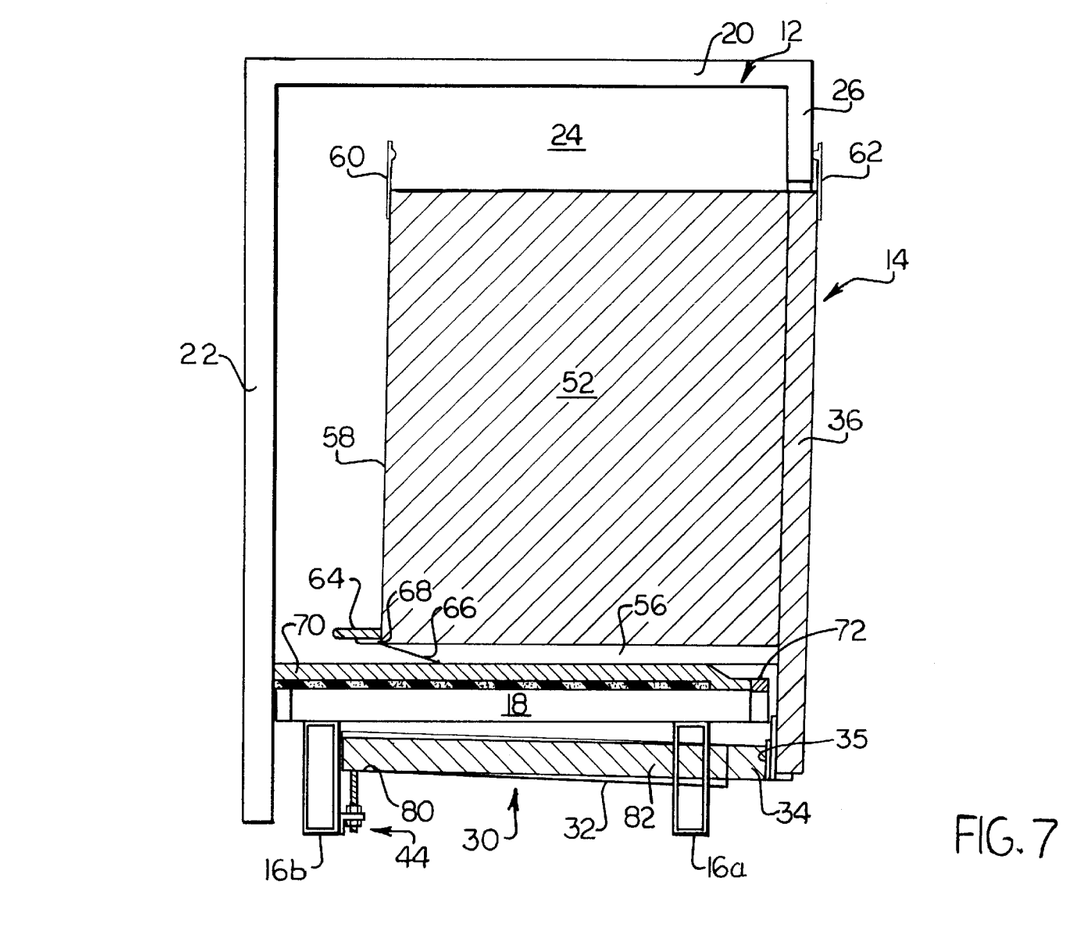
FIG. 7 is a view similar to FIG. 1, but illustrating the embodiment of the invention disclosed in FIG. 6.
Figure 8:
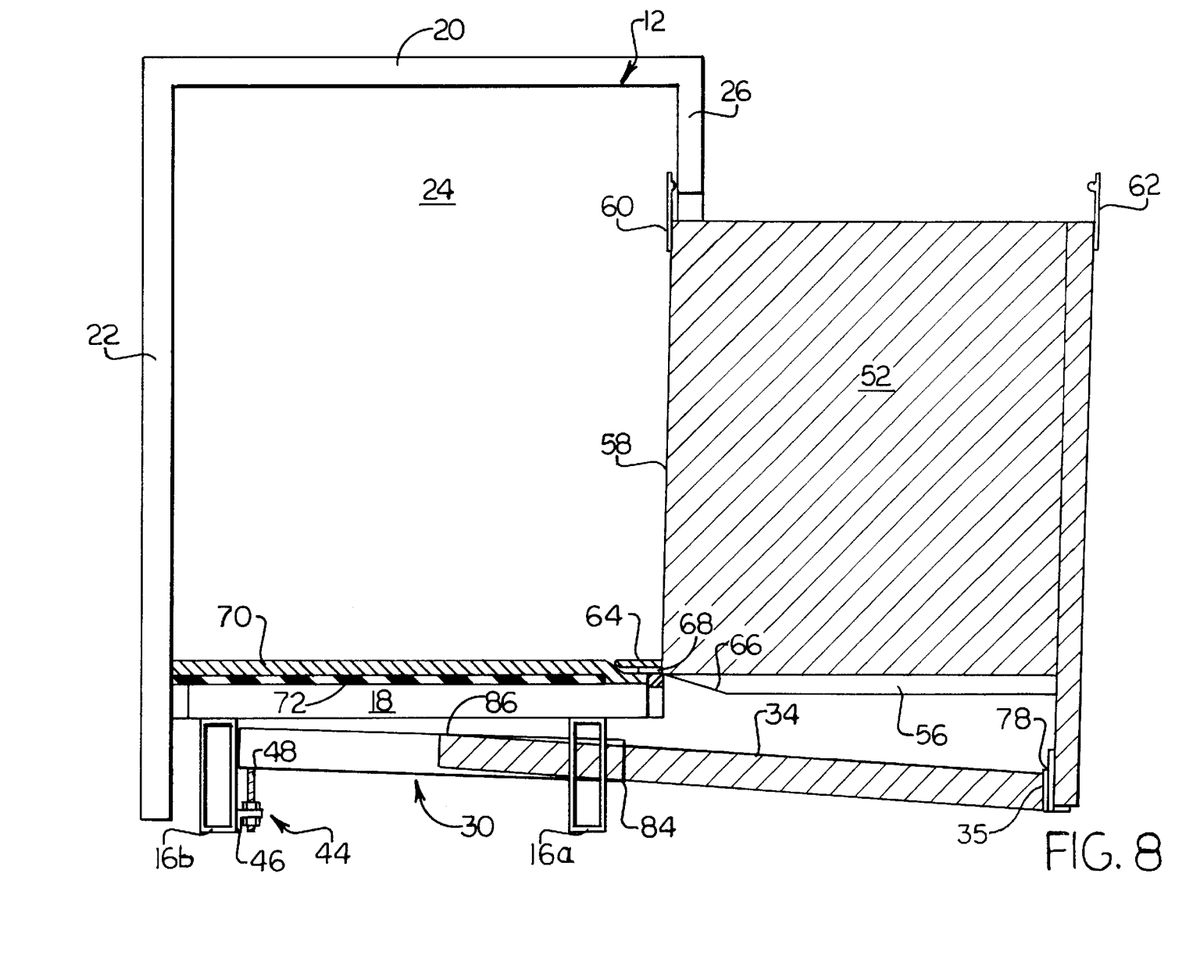
FIG. 8 is a view similar to FIG. 7 but illustrating the slide out room in the fully extended position.

Referring now to the embodiments of FIGS. 7 and 8, the deflection of the inner, member 34 as the room 14 extends may be controlled by use of the height adjustor 44 to adjust the angle of the extendible member 30 about the pivot connection between the extendible member and the frame member 16a to either supplement or replace bending of the inner member 34 as a mechanism for maintaining the floor 56 of the room 14 level. As illustrated in FIG. 7, inner member 34 moves within outer member 32 with a working clearance. In FIG. 7, in which the room 14 is fully retracted, the lower edge of the inner member 34 bears against the lower edge of the outer member 32 at a point 80 adjacent the height adjustor 44, and the upper surface of the inner member 34 bears against the upper surface at a point 82 adjacent the outer end 84 of the outer member 32. However, as the slide out room extends, the weight of the room will be transferred from the floor 18 to the member 34 as described above, thereby forcing the member 34 downwardly so that the lower edge of the inner member 34 as brought to engagement with the lower edge of the outer member 32 at the end 84 and that the upper edge of the inner member 34 will contact the upper edge of the outer member 32 at a point 86. This shift in the inner member 34 through the clearance supplements the slope of the extendible member 32 is adjusted by the mechanism 44 such that the slope of extendible member 32 and any deflection of the inner member 34 achieves leveling of the floor 56 substantially flush with the floor 18. As the room 14 is extended and retracted, the shift of the inner member 34 through the clearance between the FIG. 7 and FIG. 8 positions also provides an accommodation to prevent any binding of the inner member 34 in the outer member 32 as it is extended and retracted.

Figure 9:
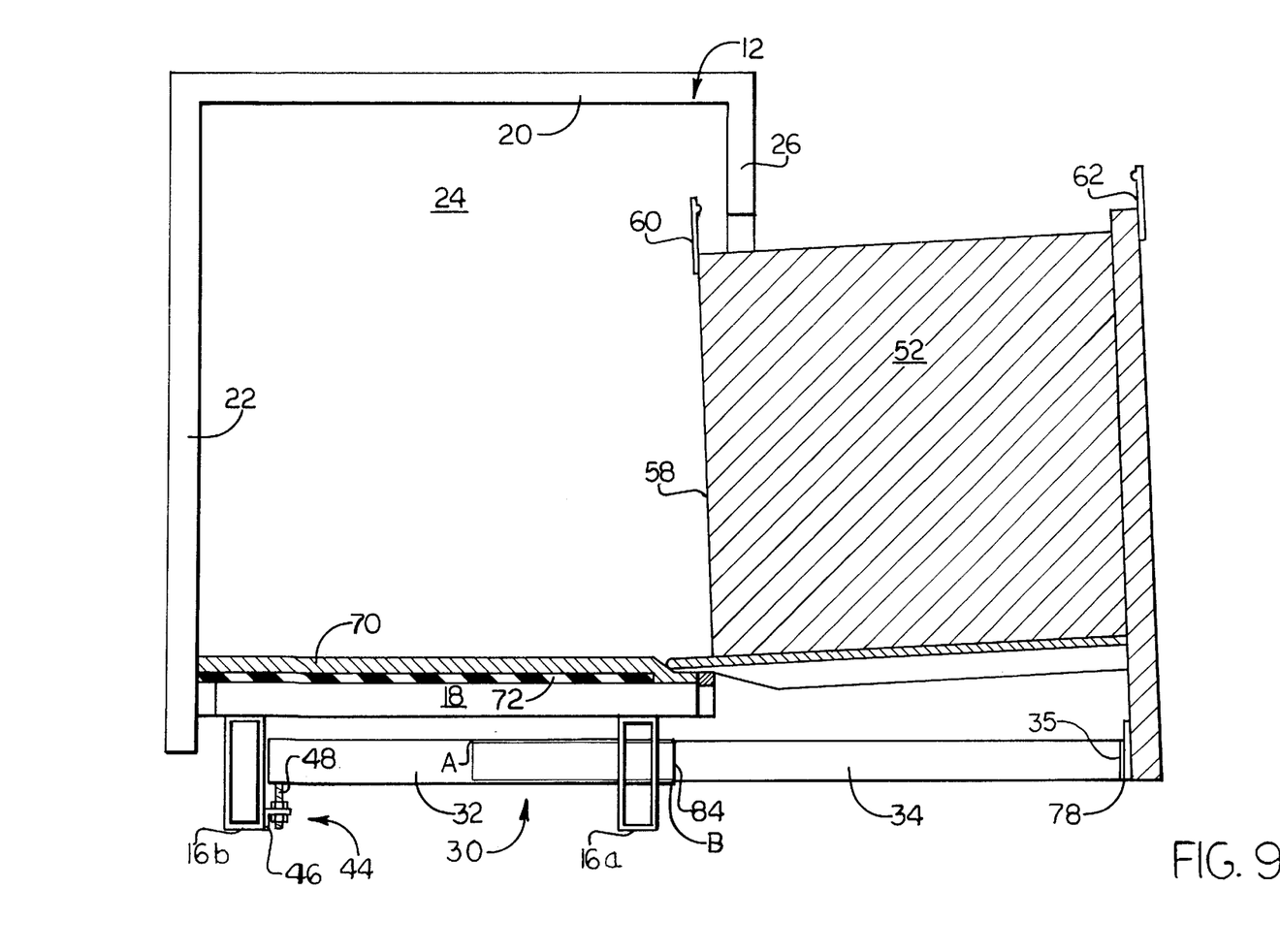
FIG. 9 is a view similar to FIG. 8, but illustrating another embodiment of the invention, and illustrating the position of the slide-out room before leveling adjustments are made.
Figure 10:
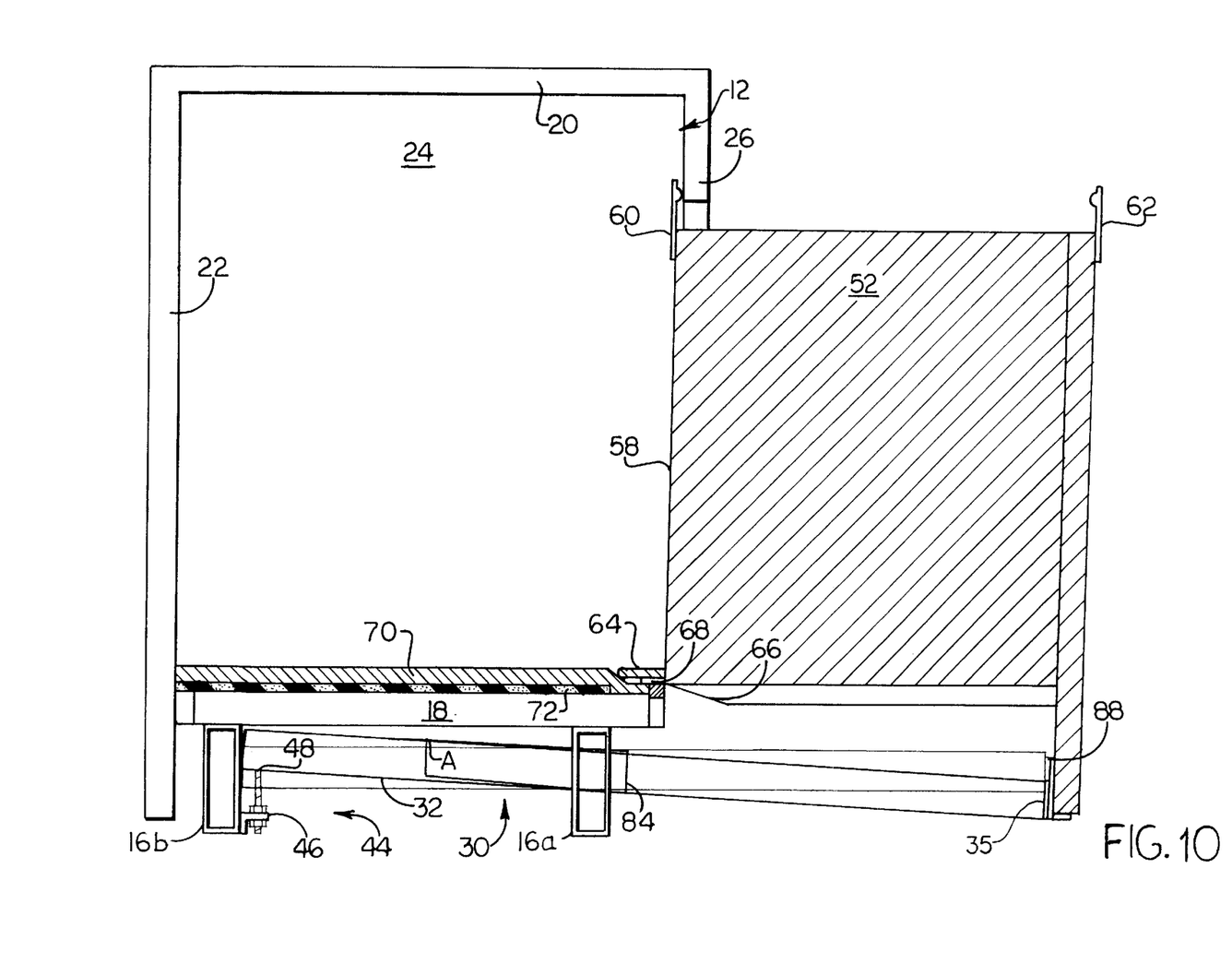
FIG. 10 is a view similar to FIG. 9, but illustrating the position of the slide out room after the leveling adjustment has been made.

Referring now to the embodiment of FIGS. 9 and 10, the outer tubular member 32 is rigidly secured to the main frame member 16a as by welding and is adjusted to adjust the final position of the slide out room by use of the adjustment mechanism 44. Referring to FIG. 9, the slide out room is in the fully extended position, and the inner member 34 bears on the upper surface of outer tubular member 32 at engagement point A and at the lower surface of tubular member 32 and engagement point B at end 84 of the outer tubular member 32.

However, the floor of the slide out room is not level with the main floor. Referring to FIG. 10, the position of the tubular members 32, 34 in FIG. 9 is illustrated in phantom. In FIG. 10, the adjustment mechanism 44 has been operated to raise the end of the outer tubular member 32 adjacent the main frame member 16b. Since, as discussed above, the outer tubular member is rigidly secured to the main frame member 16a, raising the end of tubular member 32 by operation of the adjustment mechanism 44 bends the outer tubular member 32 from the phantom line position to the solid line position in FIG. 10. Accordingly, engagement point A in FIG. 9 has been raised slightly to engagement point A' in FIG. 10. Accordingly, the outer end 88, is lowered from the phantom line position to the solid line position, thus leveling the slide out room. Of course, the inner tubular member 34 can also be designed to deflect so that, optionally, the slide out room 52 may be leveled both by deflection of the inner tubular member 34 and by bending of the outer tubular member 32 by operation of the adjustment mechanism 48. Preferably, outer tubular member 32 includes a longitudinally extending slot (not shown) which runs the entire length of the tubular member but on only one side surface thereof. The slot facilitates bending of the outer tubular member 32 as illustrated in FIG. 10.

What is claimed is:

1. Transportable living quarters for a main frame for supporting structure defining a main living area and a slide out room assembly being slidable relative to said structure between a retracted position retracted within the main living area and an extended position extended from the main living area to provide an auxiliary living area, said structure including a main floor supported by said frame, said slide out room including a slide out room floor movable from a raised position sliding over said main floor as said slide out room slides between the extended and retracted positions to a lowered position vertically displaced relative to the raised position and substantially flush with the main floor as the slide out room moves into the extended position and movable from the lowered to the raised position as the slide out room is moved from the extended position, and an extendable support member mounted on said main frame and connected to said slide out room for supporting the slide out room as the slide out room moves between the retracted and the extended position, the weight of the slide out room being transferrable from said main floor to said extendable support member as said slide out room is moved toward said extended position, said extendable support member being adapted to deflect in response to said weight transfer by a predetermined amount being substantially equal to the vertical displacement of the room floor to permit said slide out room floor to move to said lowered position, where said slide out room floor and said main floor are substantially flush.

2. Transportable living quarters as claimed in claim 1, wherein said extendable support member is adapted to deflect by bending in response to said weight transfer.

3. Transportable living quarters as claimed in claim 2, wherein said extendable member includes an outer tubular member which slidably receives an inner tubular member, one of said tubular members being mounted on said main flame, the other tubular member having an end connected to said slide out room floor, said other tubular member being adapted to deflect in response to said weight transfer to permit said slide out room floor to move to said lowered position.

4. Transportable living quarters as claimed in claim 3, wherein said one tubular member is pivotably connected to said main frame to permit the vertical position of the end of the other tubular member to be adjusted to adjust the position of the slide out room floor in the extended position.

5. Transportable living quarters as claimed in claim 4, wherein said main frame includes a pair of longitudinally extending main frame members, said one tubular member extending transversely between said main frame members and being pivotally connected at a first connection point to one of said main frame members with the other tubular member extending from said one tubular member, said one tubular member being connected to the other main frame member at a second connection point via an adjustable connection mechanism to permit said second connection point of said one tubular member to be raised and lowered relative to said one main frame member to thereby lower and raise the end of the other tubular member connected to said slide out room floor.

6. Transportable living quarters as claimed in claim 1, wherein said extendable member includes an outer tubular member which slidably receives an inner tubular member, one of said tubular members being mounted on said main frame, the other tubular member being connected to said slide out room, said other tubular member being adapted to deflect relative to the one tubular member in response to said weight transfer.

7. Transportable living quarters as claimed in claim 6, wherein said inner tubular member is received in the outer tubular member with clearance between an upper surface of the inner tubular member and an upper surface of said outer tubular member, said outer tubular member terminating in an open end through which said inner tubular member extends, said inner member being adapted to move through said clearance in response to said weight transfer from a raised position to a lowered position.

8. Transportable living quarters as claimed in claim 6, wherein said outer tubular member is pivotably connected to said main frame to permit the position of the end of the outer tubular member to be adjusted vertically.

9. Transportable living quarters as claimed in claim 6, wherein said main frame includes a pair of longitudinally extending main frame members, said outer tubular member extending transversely between said main frame members and being pivotally connected to one of said main frame members, said outer tubular member being connected to the other main frame member via an adjustable connection mechanism to permit said outer tubular member to be raised and lowered relative to said other main frame member to thereby also lower and raise said end of the outer tubular member.

10. Transportable living quarters as claimed in claim 6, wherein said inner tubular member is received with clearance in the outer tubular member, said outer member having upper and lower surfaces terminating in an open end through which the inner member extends, said inner member being adapted to move through said clearance in response to said weight transfer toward the upper surface of the outer member, and means for adjusting said outer member with respect to the main frame.

11. Transportable living quarters as claimed in claim 10, wherein said main frame includes a pair of main frame members extending longitudinally with respect to the main floor and spaced transversely with respect thereto, said outer tubular member extending transversely between the main frame members and being connected at a first connection point to one of said main frame members and connected to the other main frame member via an adjustable connection at a second connection point to permit said upper surface of the outer member to be raised and lowered by raising and lowering said second connection point.

12. Transportable living quarters as claimed in claim 11, wherein said outer tubular member is connected to said one main frame member at said first connection point via a pivot connection.

13. Transportable living quarters as claimed in claim 11, wherein said outer tubular member is connected to said one main frame member at said first connection point via a rigid connection, said outer tubular member being bendable in response to raising and lowering of said second connection point, thereby raising and lowering said upper surface of the outer tubular member.

14. Transportable living quarters as claimed in claim 1, wherein said extendable member includes inner and outer coaxial tubular members, one of said tubular members being pivotably connected via a pivot connection to said main frame, the other tubular member having an end connected to said slide out room, said pivot connection being adapted to permit the vertical position of said end of the outer tubular member to be adjusted to adjust the position of the slide out room floor in the extended position.

15. Transportable living quarters as claimed in claim 4, wherein said main frame includes a pair of longitudinally extending main frame members and said extendible member includes inner and outer tubular members, said outer tubular member extending transversely between said main frame members and being pivotally connected to one of said main frame members with the inner tubular member extending from said one main frame member and connected to the slide out room, said one tubular member being connected to the other main frame member via an adjustable connection mechanism to permit said one tubular member to be raised and lowered relative to said one main frame member to thereby also raise and lower the end of the other tubular member connected to said slide out room floor.

16. Transportable living quarters having a main frame supporting structure defining a main living area and a slide out room assembly slidable relative to said structure between a retracted position retracted within the main living area and an extended position extended from the main living area to provide an auxiliary living area said structure including a main floor supported by said frame, said slide out room including a slide out room floor movable from a raised position sliding over said main floor as said slide out room is moved between the extended and retracted positions to a lowered position substantially flush with the main floor as the slide out room is moved into the extended position and movable from the lowered to the raised position as the slide out room is moved from the extended position, and an extendible support member connected to said slide out room and connected to said main frame via an adjustable connection to permit the extendible member to be adjusted to adjust the position of the slide out room in the extended position.

17. Transportable living quarters as claimed in claim 16, wherein said main frame includes a pair of longitudinally extending main frame members, said extendible support member extending transversely between said main frame members and being pivotally connected to one of said main frame members and connected to the other main frame member via an adjustable connection mechanism to permit said extendible support member to be raised and lowered relative to said one main frame member to thereby also raise and lower the slide out room floor when the slide out room is in the extended position.

18. Transportable living quarters as claimed in claim 16, wherein said extendible support member is adapted to deflect by bending in response to transfer of the weight of said slide out room from said main floor to said extendible support member as said slide out room is moved toward said extended position.

19. Transportable living quarters as claimed in claim 16, wherein said extendible member includes an outer tubular member which slidably receives an inner tubular member, one of said tubular members being mounted on said main frame, the other tubular member being connected to said slide out room, said other tubular member being adapted to deflect relative to the one tubular member in response to transfer of weight of said slide out room from said main floor to said extendible support member as said slide out room is moved toward said extended position.

20. Transportable living quarters as claimed in claim 16, wherein said extendible member includes an outer tubular member mounted on said main frame and an inner tubular member, said inner tubular member being received with clearance in the outer tubular member, said outer tubular member having upper end lower surfaces terminating in an open end through which the inner member extends, said inner member being adapted to move through said clearance in response to said weight transfer to engage the upper surface of the outer member, and means for adjusting said outer member vertically with respect to the main frame.

21. Transportable living quarters as claimed in claim 20, wherein said outer tubular member is pivotally mounted on said main frame via a pivot connection, and adjustment means for raising and lowering the engagement point by pivoting the outer tubular member about said pivot connection.

22. Transportable living quarters as claimed in claim 20, wherein said outer tubular member is rigidly mounted on said frame, and adjustment means for bending the outer tubular member to raise and lower the upper surface of the outer tubular member.

23. Transportable living quarters having a main frame supporting structure defining a main living area and a slide out room assembly slidable relative to said structure between a retracted position retracted within the main living area and an extended position extended from the main living area to provide an auxiliary living area, said structure including a main floor supported by said frame, said slide out room including a slide out room floor movable from a raised position wherein said slide out room floor is adapted to move over said main floor as said slide out room is moved between the extended and the retracted positions to a lowered position vertically displaced relative to the raised position wherein said slide out room floor is substantially flush with the main floor as the slide out room is moved into the extended position and movable from the lowered to the raised position as the slide out room is moved from the extended position, and an extendible support member having an outer tubular member which slidably receives an inner tubular member, said inner tubular member being, connected to said slide out room, the outer tubular member being mounted on said main frame, said outer tubular member, said frame, and said inner tubular member together being adapted to simultaneously guide said slide out room into said extended position and said slide out room floor into said lowered position, and further being adapted to simultaneously guide said slide out room floor into said raised position, and the slide out room away from the extended position, said inner tubular member being adapted to deflect relative to the outer tubular member as said slide out room is moved into the extended position by a predetermined amount being substantially equal to the vertical displacement of the room floor to permit said slide out room floor to move into said lowered position, where said slide out room floor and said main floor are substantially flush.

24. Transportable living quarters as claimed in claim 23, wherein said main frame includes a pair of parallel main frame members extending longitudinally with respect to the living quarters, said tubular members extending transversely with respect to the main frame member, said outer tubular member being rigidly secured to one of said main frame members.

25. Transportable living quarters as claimed in claim 23, wherein said inner tubular member is adapted to deflect by bending relative to the outer tubular member in response to transfer of the weight of the slide out room from said main floor to said extendible support member as said slide out room is moved toward said extended position.

26. Transportable living quarters as claimed in claim 23, wherein said inner tubular member is received with clearance within the outer tubular member, said outer tubular member having upper and lower surfaces, said inner tubular member being adapted to deflect relative to the outer tubular member by moving through said clearance in response to weight transfer as said slide out room moves toward the extended position such that the inner tubular member moves relative to the outer tubular member to engage said upper surface.

27. Transportable living quarters as claimed in claim 24, wherein said outer tubular member is secured to said one main flame member at a connection point adjacent one end of said outer tubular member and slopes upwardly toward said main floor and laterally toward the other main frame member, said inner tubular member extending from said one end of the outer tubular member and being secured to said slide out room.

28. Transportable living quarters as claimed in claim 27, wherein said inner tubular member is adapted to deflect by bending relative to the outer tubular member in response to transfer of the weight of the slide out room from said main floor to said extendible support member as said slide out room is moved toward said extended position.

29. Transportable living quarters as claimed in claim 28, wherein said inner tubular member is received with clearance within the outer tubular member, said outer tubular member having upper and lower surfaces, said inner tubular member being adapted to deflect relative to the outer tubular member by moving through said clearance in response to weight transfer as said slide out room is moved toward the extended position such that the inner tubular moves relative to the outer tubular member to engage said upper surface.

30. Transportable living quarters as claimed in claim 23, wherein said inner tubular member is received with clearance within the outer tubular member, said outer tubular member having upper and lower surfaces, said inner tubular member being adapted to deflect relative to the outer tubular member by moving through said clearance in response to weight transfer as said slide out room is moved toward the extended position such that the inner tubular member moves relative to the outer tubular member to engage said upper surface.

31. Transportable living quarters having a pair of longitudinally extending main frame members supporting structure defining a main living area and a slide out room assembly slidable relative to said structure between a retracted position retracted within the main living area and an extended position extended from the main living area to provide an auxiliary living area, said structure including a main floor supported by said frame, said slide out room including a slide out room floor movable from a raised position wherein said slide out room floor is movable over said main floor as said slide out room is moved between the extended and retracted positions to a lowered position vertically displaced relative to the raised position wherein said slide out room floor is substantially flush with the main floor as the slide out room is moved into the extended position and movable from the lowered to the raised position as the slide out room is moved from the extended position, an outer tubular member secured to one of said main frame members at a connection point adjacent one end of said outer tubular member, an inner tubular member extending from said one end of the outer tubular member and being secured to said slide out room assembly, said inner tubular member being adapted to deflect relative to said outer tubular member by a predetermined amount being substantially equal to the vertical displacement of the room floor to permit said slide out room floor to move into said lowered position, where said slide out room floor and said main floor are substantially flush.

32. Transportable living quarters as claimed in claim 31, wherein said inner tubular member is adapted to deflect by bending relative to the outer tubular member in response to transfer of the weight of the slide out room from said main floor to said extendible support member as said slide out room is moved toward said extended position.

33. Transportable living quarters as claimed in claim 31, wherein said inner tubular member is received with clearance within the outer tubular member, said outer tubular member having upper and lower surfaces, said inner tubular member being adapted to deflect relative to the outer tubular member by moving through said clearance in response to weight transfer as said slide out room moves toward the extended position such that the inner tubular moves relative to the outer tubular member to engage said upper surface.

34. Transportable living quarters having a pair of longitudinally extending main frame members supporting structure defining a main living area and a slide out room assembly slidable relative to said structure between a retracted position retracted within the main living area and an extended position extended from the main living area to provide an auxiliary living area, said structure including a main floor supported by said frame, said slide out room including a slide out room floor movable from a raised position wherein said slide out room floor is movable over said main floor as said slide out room is moved between the extended and retracted positions to a lowered position wherein said slide out room floor is substantially flush with the main floor as the slide out room is moved into the extended position and movable from the lowered to the raised position as the slide out room is moved from the extended position, an outer tubular member secured to one of said main frame members at a connection point adjacent one end of said outer tubular member, an inner tubular member extending from said one end of the outer tubular member and being secured to said slide out room assembly, said outer tubular member sloping upwardly from said connection point toward said main floor and laterally toward the other main frame member.

\* \* \* \* \*

UNITED STATES PATENT AND TRADEMARK OFFICE
CERTIFICATE OF CORRECTION

PATENT NO. : 6,182,401 B1
DATED : February 6, 2001
INVENTOR(S) : Patrick W. McManus et al.

It is certified that error appears in the above-identified patent and that said Letters Patent is hereby corrected as shown below:

Claim 3,
Line 47, "flame" should be -- frame --

Claim 27,
Line 13, "flame" should be -- frame --

Signed and Sealed this

Ninth Day of October, 2001

Attest:

NICHOLAS P. GODICI
Attesting Officer
Acting Director of the United States Patent and Trademark Office